United States Patent
Ryu

(10) Patent No.: US 10,115,295 B2
(45) Date of Patent: Oct. 30, 2018

(54) PORTABLE SECURITY DEVICE HAVING RESCUE REQUEST FUNCTION BASED ON INTERNET OF THINGS AND SECURITY SYSTEM USING THE SAME

(71) Applicant: Sang Up Ryu, Goyang-si (KR)

(72) Inventor: Sang Up Ryu, Goyang-si (KR)

(*) Notice: Subject to any disclaimer, the term of this patent is extended or adjusted under 35 U.S.C. 154(b) by 0 days.

(21) Appl. No.: 15/792,936

(22) Filed: Oct. 25, 2017

(65) Prior Publication Data
US 2018/0151056 A1    May 31, 2018

(30) Foreign Application Priority Data

Nov. 11, 2016 (KR) .................. 10-2016-0149989
Oct. 24, 2017 (KR) .................. 10-2017-0138255

(51) Int. Cl.
| | | |
|---|---|---|
| *H04W 4/02* | (2018.01) | |
| *G08B 25/01* | (2006.01) | |
| *H04M 1/725* | (2006.01) | |
| *G08B 25/10* | (2006.01) | |
| *H02J 7/00* | (2006.01) | |

(52) U.S. Cl.
CPC ......... *G08B 25/016* (2013.01); *G08B 25/012* (2013.01); *G08B 25/10* (2013.01); *H04M 1/7253* (2013.01); *H04M 1/72541* (2013.01); *H02J 7/0052* (2013.01); *H04M 2242/04* (2013.01); *H04M 2250/06* (2013.01); *H04M 2250/54* (2013.01)

(58) Field of Classification Search
CPC .... G08B 25/016; G08B 25/10; G08B 25/012; H04M 1/7253; H04M 1/72541; H04M 2250/06; H04M 2242/04; H04M 2250/54; H02J 7/0052; H04W 4/02
See application file for complete search history.

(56) References Cited

U.S. PATENT DOCUMENTS

| | | | |
|---|---|---|---|
| 6,675,006 B1* | 1/2004 | Diaz | B60R 25/1004 455/404.1 |
| 2017/0238129 A1* | 8/2017 | Maier | H04W 4/02 455/404.2 |
| 2017/0272316 A1* | 9/2017 | Johnson | H04L 67/34 |
| 2018/0053391 A1* | 2/2018 | Britt | G08B 21/0205 |

FOREIGN PATENT DOCUMENTS

| | | |
|---|---|---|
| KR | 10-0204826 B1 | 3/1999 |
| KR | 20-0370506 Y1 | 12/2004 |
| KR | 20-2009-0012111 U | 11/2009 |

\* cited by examiner

*Primary Examiner* — Thanh Le
(74) *Attorney, Agent, or Firm* — Novick, Kim & Lee, PLLC; Jae Youn Kim

(57) ABSTRACT

Provided are a portable security device having a rescue request function based on IoT which sprays tear gas to perform self-protection, automatically transmits a rescue request message and notifies a rescue requester of a response of a rescuer to the rescue request message to relieve the rescue requester, and a security system using the same.

9 Claims, 3 Drawing Sheets

PORTABLE SECURITY DEVICE HAVING RESCUE REQUEST FUNCTION BASED ON INTERNET OF THINGS AND SECURITY SYSTEM USING THE SAME

TECHNICAL FIELD

The present invention relates to a portable security device having a rescue request function based on Internet of Things (IoT) and a security system using the same and, particularly, to a portable security device having a rescue request function based on IoT which sprays tear gas to perform self-protection, automatically transmits rescue request information and notifies a rescue requester of a response to the rescue request information through a smartphone to relieve the rescue requester, and a security system using the same.

BACKGROUND ART

Generally, security devices are used to secure a user against a person who intends to do harm the user. An alarm generator which generates an alarm sound to ask surrounding people to help, a stun gun which generates electric shock using high-voltage electricity, a pepper spray which sprays a dacryogenic or narcotic material using a high-pressure gas to repel an attacker, a flash which temporarily blinds an attacker using strong light, and the like are used as security devices.

Conventional technologies with respect to security devices are disclosed in Patent Documents 1 to 3 below.

The conventional technology disclosed in Patent Document 1 provides a compact multifunctional security device which is easily carried, accommodates a battery and a gas tank and includes a high-voltage discharge electrode to prevent crime and easily cope with attackers.

The conventional technology disclosed in Patent Document 2 provides an alert and spray device for security which has a security device case having the same appearance as an everyday object such that the device can be misrecognized as an everyday object, and selectively performs generation of an alarm sound and spraying of a tear gas to appropriately protect a user according to situation.

The conventional technology disclosed in Patent Document 3 provides an alert and spray device for security which has a case in the form of an everyday object, includes an internal illuminator for securing front visibility and recognizing the device at night, generates an alarm sound through a speaker or takes proper measures through lighting, and sprays a dacryogenic solution at an attacker to secure a user.

RELATED ART DOCUMENT

Patent Document (Patent Document 1) Korean Patent No. 10-0204826 (30 Mar. 1999) Multifunction security device (Patent Literature 2) Korean Patent No. 20-0370506 (6 Dec. 2004) (Alert and spray device for security)

(Patent Literature 3) Korean Utility Model No. 20-2009-0012111 (27 Nov. 2009) (Alert and spray device for security)

DETAILED DESCRIPTION OF THE INVENTION

Technical Problems

However, the above-described conventional technologies perform only fragmentary functions such as generation of an alarm, electric shock, spray of gas, and generation of flash and cannot transmit a rescue request message to request rescue or notify a rescue requester of a reply of a rescuer.

In addition, conventional security devices serve to execute only a security function and cannot be used as a charging device for charging a mobile device such as a smartphone.

Accordingly, the present invention has been made in view of the above problems, and it is an object of the present invention to provide a portable security device having a rescue request function based on IoT which sprays a tear solution to perform self-protection and automatically transmits a rescue request message, and a security system using the same.

It is another object of the present invention to provide a portable security device having a rescue request function based on IoT which notifies a rescue requester of a rescuer's response to a rescue request message to relieve the rescue requester, and a security system using the same.

It is still another object of the present invention to provide a portable security device having a rescue request function based on IoT which captures an image of a surrounding environment using a camera and transmits a rescue request message including the captured image along with position information to a rescuer such that the rescuer can correctly recognize the location and situation of the scene of rescue and easily identify and arrest a suspect in case a crime is committed, and a security system using the same.

It is yet another object of the present invention to provide a portable security device having a rescue request function based on IoT which includes a rechargeable battery and serves as an auxiliary battery for charging a portable device such as a smartphone as necessary, and a security system using the same.

It is further another object of the present invention to provide a portable security device having a rescue request function based on IoT which can serve as an IoT device such as a portable CCTV for tracking, which can perform remote monitoring and observation through a camera included therein, and a security system using the same.

Technical Solutions

To accomplish the aforementioned object, a portable security device having an Internet of Things (IoT) based rescue request function according to the present invention includes: a main switch for selecting a rescue request function in case of emergency and receiving a security function and operation command; a security application execution unit for executing a security application when a security function is selected through the main switch; a camera for capturing an image when photographing is selected through the main switch; a voice input unit for receiving a voice input through a microphone in the case of the security function; a security controller for generating rescue request information including an image captured by the camera, a voice acquired through the voice input unit and security information stored in an internal memory according to the security application executed by the security application execution unit, and controlling transmission of the generated rescue request information; and a communication unit for establishing local wireless communication with a smartphone, converting the rescue request information into wireless data by interoperating with the security controller and transmitting the wireless data to the smartphone.

The communication unit may receive a response signal to the rescue request information, transmitted from the smartphone, and transmit the response signal to the security controller to achieve bidirectional communication.

The portable security device may further include: a vibration generator for generating vibration upon transmission of the rescue request information or reception of the response signal under the control of the security controller; a power supply including a rechargeable battery; and a display for displaying a charging state of the rechargeable battery and captured pictures or images and visually indicating a rescue request or a response signal when the rescue request or the response signal is received, wherein the power supply serves as an auxiliary battery for charging a portable device with power stored in the rechargeable battery when connected to the portable device.

The camera may photograph a surrounding environment to capture an image for remote monitoring and tracking when the security function is not used according to a function input through the main switch, and the security controller may control an image acquired by the camera to be transmitted through the communication unit when a non-security function is executed, map the captured image to date and time information and store the mapped information in the internal memory.

The portable security device may further include: a laser/light driver for driving a laser and high-luminance light to emit a laser and high-luminance light under the control of the security controller; a function selection switch for selecting a CCTV function or an emergency alert function; and an alarm sound generator for generating an alarm sound under the control of the security controller, wherein the laser/light driver serves as a light when a non-security function is executed, and the alarm sound generator generates an alarm sound through a speaker when the emergency alert function is executed or a "first stage" of a trigger is operated.

The portable security device may further include a trigger switch for detecting an operating state of a trigger according to user manipulation and delivering the detected operating state to the security controller, wherein the security controller controls opening of a nozzle cover covering a nozzle for spraying a tear gas, automatic transmission of rescue request information, generation of alarm and emission of high-luminance light upon detection of a "first stage" operation through the trigger switch and controls spray of a dacryogenic solution upon detection of a "second stage" operation through the trigger switch.

The portable security device may further include: a body; a handle provided to the body and providing convenience in use of the security device; and a handle button for folding and unfolding the handle according to user manipulation, wherein the handle is folded into or unfolded from the body in a sliding manner.

A security system using a portable security device having an IoT based rescue request function includes: the potable security device performing real-time rescue request on the basis of IoT and executing a security function in case of emergency and normally serving as a CCTV; a smartphone establishing local wireless network connection with the portable security device through Wi-Fi Direct, extracting map information using current position information when rescue request information is generated from the portable security device, mapping the extracted map information, a rescue request image, current date and time information and rescuer terminal information to one another and transmitting the mapped information as rescue information to a security server; and the security server receiving the rescue information transmitted from the smartphone, generating a security message on the basis of the rescue information and transmitting the security message to a rescuer terminal.

The portable security device may include: a main switch for selecting a rescue request function in case of emergency situation and receiving a security function and operation command; a security application execution unit for executing a security application when a security function is selected through the main switch; a camera for capturing an image when photographing is selected through the main switch; a voice input unit for receiving a voice input through a microphone in the case of the security function; a power supply including a rechargeable battery; a security controller for generating rescue request information including an image captured by the camera, a voice acquired through the voice input unit and security information stored in an internal memory according to the security application executed by the security application execution unit, and controlling transmission of the generated rescue request information; a communication unit for establishing local wireless communication with a smartphone, converting the rescue request information into wireless data by interoperating with the security controller and transmitting the wireless data to the smartphone; a laser/light driver for driving a laser and a high-luminance light to emit a laser and high-luminance light under the control of the security controller; a function selection switch for selecting a CCTV function or an emergency alert function; an alarm sound generator for generating an alarm sound under the control of the security controller; a vibration generator for generating vibration upon transmission of rescue request information or reception of a response signal under the control of the security controller; a display for displaying a charging state of the rechargeable battery and captured pictures or images and visually indicating a rescue request or a response signal when the rescue request or the response signal is received; a body; a handle providing convenience in use of the security device; and a handle button for folding and unfolding the handle according to user manipulation.

Advantageous Effects

According to the present invention, it is possible to spray a dacryogenic solution to perform self-protection, automatically transmit a rescue request message, and notify a rescue requester of a response to the rescue request message such that the rescue requester can cope with an emergency situation until rescued.

In addition, according to the present invention, it is possible to capture an image of a surrounding environment using a camera and transmits a rescue request message including the captured image along with position information to a rescuer such that the rescuer can correctly recognize the location and situation of the scene of rescue and easily identify and arrest a suspect in case a crime is committed.

Furthermore, a portable security device according to the present invention can be used as an auxiliary battery for charging a portable device such as a smartphone and can also be used as an IoT device such as a portable CCTV for tracking, which can perform remote monitoring and observation through a camera included therein.

BEST MODE FOR CARRYING OUT THE INVENTION

Hereinafter, a portable security device having an IoT based rescue request function and a security system using the same according to preferred embodiments of the present invention will be described in detail below with reference to the attached drawings.

Figure 1A:
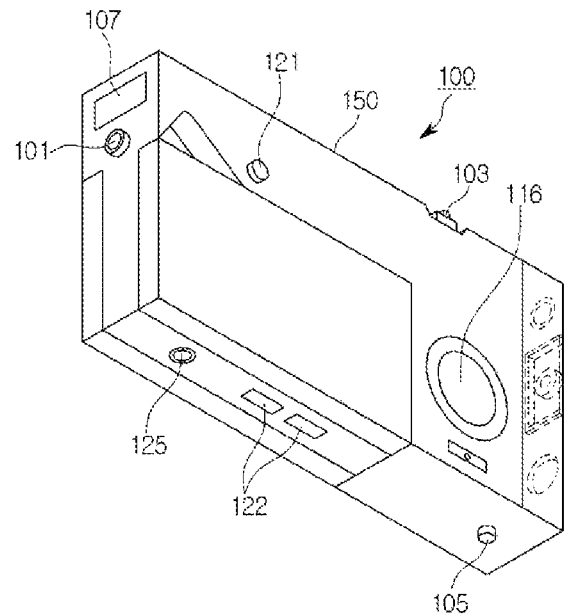
FIGS. 1a and 1b are schematic diagrams illustrating a portable security device having an IoT based rescue request function according to the present invention.
Figure 1B:
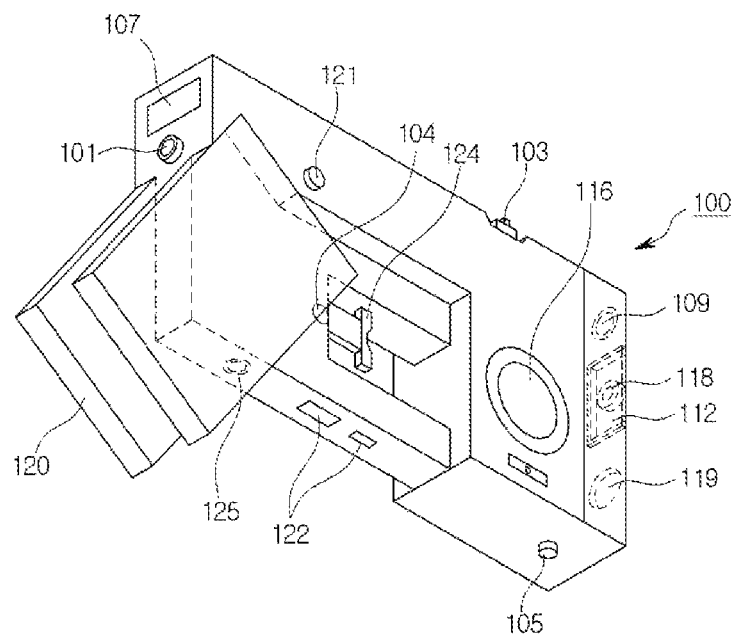
Figure 2:
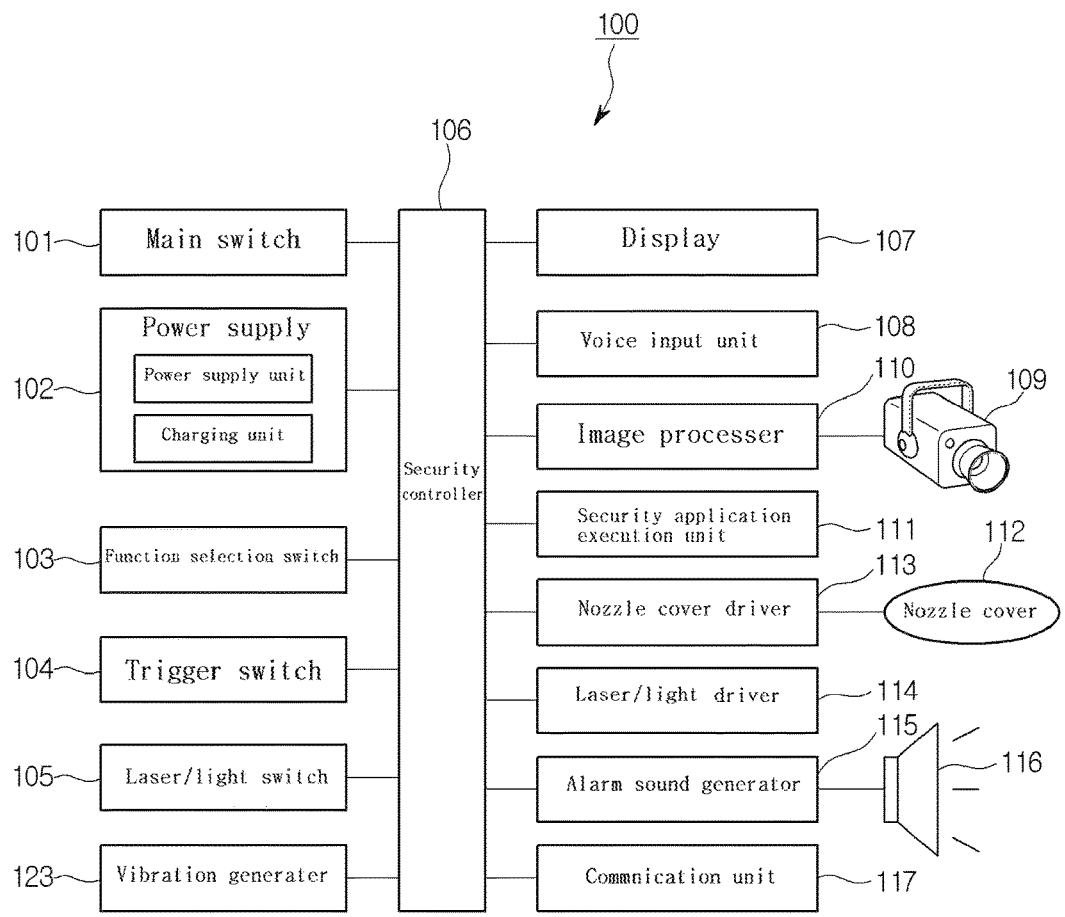
FIG. 2 is a block diagram of the portable security device having an IoT based rescue request function according to the present invention.

FIGS. 1a and 1b are schematic diagrams illustrating a portable security device 100 having an IoT based rescue request function according to a preferred embodiment of the present invention and FIG. 2 is a block diagram of the portable security device 100 having an IoT based rescue request function according to the present invention.

The portable security device 100 having an IoT based rescue request function according to the present invention includes a handle 120 which is foldable with respect to a body 150. The portable security device looks like a smart device when the handle 120 is folded into the body 150 and looks like a weapon for security which can threaten an attacker when the handle 120 is unfolded from the body 150.

A handle button 121 for folding/unfolding the handle 120 according to user manipulation is provided at a predetermined position of the body 150. When a user wants to use the portable security device, the user pushes the handle button 121 so that the handle 121 slides around a hinge axis according to an elastic means to be unfolded from the body 150. Accordingly, the user can conveniently use the handle. To fold the handle 120 into the body 150, the user presses the handle 120 with the handle button 121 pushed so that the handle 120 is returned to the original position thereof in a sliding manner.

In addition, a main switch 101 through which security and rescue request functions are selected and an operation command is input is provided on the rear side of the body 150. The security function is executed or a rescue request command is input by operating the main switch 101.

A display 107 for displaying a charging state of a built-in rechargeable battery and a captured picture or image is provided to the rear side of the body 150. A liquid crystal display (LCD) may be used as the display 107.

It is desirable that the display 107 further include an indication device which visually indicates a rescue request or a response signal when the rescue request or the response signal is received. Such an indication device may use LEDs. It is desirable to indicate a rescue request state using a red LED when a rescue request is performed and to indicate a response reception state using a blue LED when a response to transmission of a rescue signal to a rescuer is received.

Furthermore, a security application execution unit 111 which executes a security application when the security function is selected through the main switch 101 and a voice input unit 108 through which external voice is input using a microphone are embedded in the body 150.

In addition, a camera 109 for photographing a subject to capture an image is provided to the front side of the body 150 and an image processor 110 for signal-processing an image captured by the camera 109 is embedded in the body 150. The camera 109 is used for an IoT function of photographing a surrounding environment to perform remote monitoring and acquiring tracking images when the security function is not selected through the main switch 101.

The body 150 includes a security controller 106 which generates rescue request information including an image acquired by the camera 109 according to the security application executed by the security application execution unit 111, security information stored in an internal memory, and a voice acquired through the voice input unit 108 and controls transmission of the generated rescue request information. It is desirable that the security controller 106 be configured as a control device such as a microcomputer, a microprocessor, a central processing unit or a controller.

It is desirable that the security controller 106 transmit an image acquired by the camera 109 through a communication unit 117 to control the security device to be used as a CCTV when a non-security function is executed. Further, the security controller 106 maps captured images to voice information and stores the same in the internal memory.

In addition, the body 150 includes the communication unit 117 which interoperates with the security controller 106 to convert the rescue request information into wireless data and transmit the wireless data to a wireless device such as a smartphone through local wireless communication (Wi-Fi Direct) or receives a response signal to a rescue request message transmitted through the smartphone and transmits the same to the security controller 106, to thereby achieve bidirectional communication. The communication unit 117 may be implemented as a communication module which can use a local wireless communication protocol such as Wi-Fi or Bluetooth or a communication module which can use a wireless telecommunication standard such as CDMA or LTE.

Furthermore, the body 150 includes a vibration generator 123 which generates vibration when a rescue request message is transmitted or a response signal is received under the control of the security controller 106. The user recognizes whether the rescue request message has been transmitted or a rescuer has received the rescue request message and responded thereto through the vibration.

The portable security device 100 having an IoT based rescue request function according to the present invention includes a power supply 102 equipped with a rechargeable battery. The power supply 102 usually provides driving power to the security device, and when it is connected to a portable device, serves as an auxiliary battery for charging the portable device with power stored in the rechargeable battery. To this end, the power supply 102 preferably includes a power supply unit and a charging unit.

Moreover, the portable security device 100 having an IoT based rescue request function according to the present invention includes a laser/light driver 114 set in the body 150. The laser/light driver 114 drives a laser and a high-luminance light under the control of the security controller 106 to emit a laser beam and turn on the high-luminance light. It is desirable that the portable security device include a laser emitting a laser beam and a high-luminance light emitting high-luminance light, which are not shown. The laser/light driver 114 serves as a lighting device when a non-security function is executed. To this end, it is desirable that a separate laser/light switch 105 be provided to the exterior of the body 150 to operate in response to the security function or other functions according to user manipulation.

In addition, the portable security device 100 having an IoT based rescue request function according to the present invention includes a function selection switch 103 for selecting a CCTV function or an emergency alert function, which is provided to the exterior of the body 150. When the emergency alert function is selected through the function selection switch 103 in case of emergency, rescue request information is immediately, automatically transmitted without the need to select other functions.

Furthermore, the portable security device 100 having an IoT based rescue request function according to the present invention includes an alarm sound generator 115 which generates an alarm sound under the control of the security controller 106.

The alarm sound generator 115 generates an alarm sound and transmits the same through a speaker 116 when the aforementioned emergency alert function is executed or a "first stage" of a trigger is operated. According to such alarm sound, the user can notify surrounding people of the emergency situation to receive help and scare off an attacker.

Moreover, the portable security device 100 having an IoT based rescue request function according to the present invention includes a trigger switch 104 which detects an operating state of the trigger and delivers the operating state to the security controller 106 according to user manipulation. It is desirable that the trigger switch 104 interoperate with the trigger 124. The trigger 124 operates through first and second stages.

In addition, the portable security device 100 having an IoT based rescue request function according to the present invention includes a nozzle cover 112 for covering an inlet of a nozzle for spraying a dacryogenic solution and a nozzle cover driver 113 for opening/closing the nozzle cover 112.

Preferably, the security controller 106 controls opening of the nozzle cover 112 for covering the nozzle for spraying a dacryogenic solution, automatic transmission of a rescue request message, generation of an alarm and emission of high-luminance light when a "first stage" operation is detected through the trigger switch 104, and controls spray of the dacryogenic solution when a "second stage" operation is detected through the trigger switch 104.

Furthermore, the portable security device 100 having an IoT based rescue request function according to the present invention includes a dacryogenic solution storage tank for storing the dacryogenic solution, and a dacryogenic solution inlet through which the dacryogenic solution is filled with the dacryogenic solution.

The operation of the portable security device having an IoT based rescue request function (referred to as a "portable security device" hereinafter) according to the present invention will be described in detail below.

When an emergency situation occurs, the user operates the function selection switch 103 of the portable security device to select the emergency alert function or operates the main switch 101 to select the security function.

Here, it is desirable that the function selection switch 103 be used when the user intends to execute the emergency alert function by simply operating the switch when it is difficult to operate the main switch 101 to execute the security function.

When the emergency alert function is selected according to operation of the function selection switch 103, the security application execution unit 111 executes the security application APP and the security controller 106 automatically performs a control operation for security on the basis of the executed security application. Here, when the operation is started according to the security function, local wireless communication connection for local wireless communication with a surrounding mobile device (e.g., smartphone) is established. Although local wireless communication can be performed in various manners, the present invention is described on the assumption that Wi-Fi Direct is used.

Upon establishment of local wireless communication connection with a surrounding mobile device, the camera 109 is operated to photograph a subject to capture an image of surroundings of the user and surrounding voice is acquired through the voice input unit 108. Subsequently, the acquired image, voice and security information prestored in the internal memory are mapped to one another to generate rescue request information. The image and voice can be used to identify or arrest a suspect later.

Thereafter, control is performed to transmit the generated rescue request information to the mobile device connected using Wi-Fi Direct through the communication unit 117. When the rescue request information is transmitted through the communication unit 117, the alarm sound generator 115 and the laser/light driver 114 are operated.

When the rescue request information is transmitted through the communication unit 117, the vibration generator 123 is simultaneously operated to vibrate the body 150 of the portable security device. In addition, a red LED emits light through the indication device of the display 107. Accordingly, the user recognizes that a rescue request message has been transmitted and thus can feel at ease and take follow-up measures.

When the alarm sound generator 115 is operated, an alarm sound is output and transmitted to the outside through the speaker 116 provided at a predetermined position of the body 150. When the alarm sound is generated, people around the user can hear the alarm sound, recognize the emergency situation and take appropriate measures to secure safety of the user. Furthermore, generation of the alarm sound scares off an attacker.

In addition, when the laser/light driver 114 is operated, the laser is driven to emit a laser beam and, simultaneously, the high-luminance light is driven to project high-luminance light. Here, the laser beam indicates a target such that the high-luminance light is projected to a target position. The user irradiates the projected high-luminance light to the face (particularly, eyes) of the attacker such that the attacker is temporarily blinded and then flees.

Furthermore, a rescuer generates a response to the rescue request information upon reception of the rescue request information. The response can be generated using a method of automatically transmitting a response signal when the received rescue request message is touched or clicked. The transmitted response signal is received through the communication unit 117 and delivered to the security controller 106. The security controller 106 operates the vibration generator 123 to generate vibration upon reception of the response signal. Simultaneously, the security controller 106 turns on the blue LED through the display 107. The user can recognize that the rescuer has received the rescue request message through the generated vibration and the turned on blue LED, and thus can feel at ease and calmly take a measure to secure safety.

Alternatively, when the security function is selected through the main switch 101, the security application execution unit 111 is operated under the control of the security controller 106 to execute the security application APP. The security controller 106 automatically performs a control operation for security on the basis of the executed security application.

For example, the camera 109 is operated to photograph a subject to capture an image of surroundings of the user and voices around the user are acquired through the voice input unit 108. Subsequently, the acquired image, voices and security information prestored in the internal memory are mapped to one another to generate rescue request information.

Then, control is performed to transmit the rescue request information to a rescuer through the communication unit 117.

Upon transmission of the rescue request information through the communication unit 117, the vibration generator 123 operates to vibrate the body 150 of the portable security device and transmission of the rescue request information is visually indicated through the display 107 simultaneously with transmission of the rescue request information. Accordingly, the user can feel at ease and take a follow-up measure upon recognizing that the rescue request message has been transmitted.

In addition, a rescuer generates a response to the rescue request information upon reception of the rescue request information. The response can be generated using a method of automatically transmitting a response signal when the received rescue request message is touched or clicked. The transmitted response signal is received through the communication unit 117 and delivered to the security controller 106. The security controller 106 operates the vibration generator 123 to generate vibration upon reception of the response signal. Simultaneously, the security controller 106 turns on the blue LED through the display 107. The user can recognize that the rescuer has received the rescue request message through the generated vibration and the turned on blue LED, and thus can feel at ease and calmly take a measure to secure safety.

The user manipulates the handle button 121 for security using the portable security device. When the handle button 121 is pushed, the handle 121 slides around the hinge axis according to the elastic means to be unfolded from the body 150 and thus the handle can be conveniently used. To fold the handle 120 into the body 150, the handle 120 is pressed with the handle button 121 pushed to be returned to the original position in a sliding manner.

The portable security device looks like a smart device when the handle 120 is folded into the body 150 and looks like a weapon for security, such as a gun, which can threaten an attacker when the handle 120 is unfolded from the body 150.

Subsequently, when the trigger 124 is slightly pulled, the "first stage" of the trigger is detected by the trigger switch 104 and delivered to the security controller 106.

Upon detection of the "first stage" of the trigger, the security controller 106 operates the nozzle cover driver 113 to open the nozzle cover 112 set on the nozzle for spraying a dacryogenic solution. Then, the alarm sound generator 115 and the laser/light driver 114 are operated.

When the alarm sound generator 115 is operated, an alarm sound is output and transmitted to the outside through the speaker 116 provided at a predetermined position of the body 150. When the alarm sound is generated, people around the user can hear the alarm sound, recognize the emergency situation and take appropriate measures to secure safety of the user. Furthermore, generation of the alarm sound warns an attacker such that the attacker cannot easily threaten the user.

In addition, when the laser/light driver 114 is operated, the laser is driven to emit a laser beam and, simultaneously, the high-luminance light is driven to project high-luminance light. Here, the laser beam indicates a target such that the high-luminance light is projected to a target position. The user irradiates the projected high-luminance light to the face (particularly, eyes) of the attacker such that the attacker cannot see temporarily and then escapes.

When the user fully pulls the trigger in order to protect themselves using the dacryogenic solution, the "second stage" of the trigger is detected by the trigger switch 104 and delivered to the security controller 106. The security controller 106 operates a dacryogenic solution spray device for spraying the dacryogenic solution, which is not shown, upon detection of the "second stage" of the trigger. According to this operation, the dacryogenic solution stored in the dacryogenic solution storage tank is sprayed through the spray nozzle to attack the attacker.

Another feature of the present invention is that the portable security device can be used as an IoT based monitoring apparatus (CCTV).

That is, the portable security device is connected to a control device (smartphone) through local wireless communication using the communication unit 117, surroundings of the user are photographed using the camera 109, and surrounding voices are acquired through the voice input unit. Then, captured images and acquired voices are mapped to generate monitoring information. The generated monitoring information is transmitted to the control device through the communication unit 117. In this manner, the portable security device can be used as an IoT apparatus to perform remote monitoring and observation.

Furthermore, another feature of the present invention is that a laser/light can be used as a normal lighting device. For example, when the user turns on the laser/light switch 105 provided at a predetermined position of the body 150, the laser/light driver 114 is operated under the control of the self-protection controller 106 to generate high-luminance light. When the portable security device is used as a normal lighting device in this manner, it is desirable that a laser beam is not emitted and only high-luminance light is turned on. Of course, the high-luminance light is turned off when the laser/light switch 105 is turned off.

In addition, another feature of the present invention is that the portable security device can be used as an auxiliary battery. For example, when a charging jack is connected to a charging terminal, the charging unit which is a charging device in the power supply 102 operates to discharge power charged in the built-in battery to the charging jack so as to charge a smart device connected to the charging jack. In this manner, the portable security device can be used as a device such as an auxiliary battery.

Figure 3:
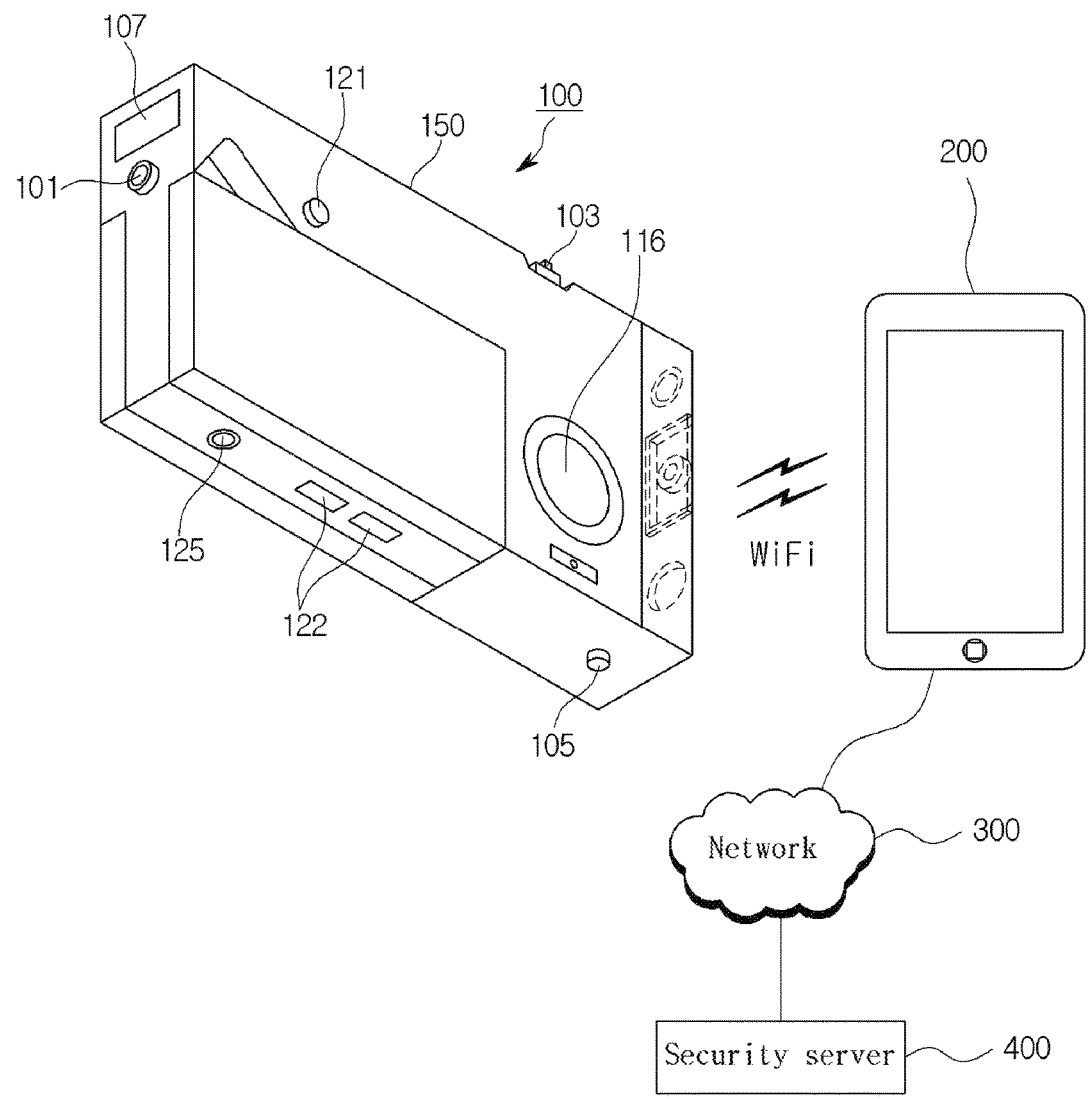
FIG. 3 is a diagram illustrating a configuration of a security system using the portable security device having an IoT based rescue request function according to the present invention.

FIG. 3 is a diagram illustrating a configuration of security system implemented using the portable security device having an IoT based rescue request function according to another embodiment of the present invention.

As illustrated in FIG. 3, the security system using the portable security device having an IoT based rescue request function according to the present invention includes the portable security device 100 used to perform real-time rescue request on the basis of IoT in case of an emergency situation and used as a CCTV usually, a smartphone 200 which establishes local wireless communication with the portable security device 100 through Wi-Fi Direct, extracts map information using current position information when rescue request information is generated from the portable security device 100, and maps the extracted map information, a rescue request image, current date and time information and rescuer terminal information to one another and transmits the mapped information as rescue information to a security server 400, and the security server 400, which receives the rescue information transmitted from the smartphone 200, generates a security message on the basis of the rescue information and transmits the security message to a rescuer terminal.

Here, it is desirable that the smartphone 200 and the security server 400 transmit and receive information through a network 300.

The operation of the aforementioned security system using the portable security device having an IoT based rescue request function according to the present invention will be described in detail below.

The configuration and operation of the portable security device 100 are the same as those illustrated in FIGS. 1a, 1b and 2.

In case of emergency, the portable security device 100 generates real-time rescue request information on the basis of IoT and transmits the real-time rescue request information to the smartphone through Wi-Fi Direct. Here, when recorded images and voices are transmitted to the smartphone 200, it is desirable to transmit the images and voices at specific intervals (e.g., every 5 seconds).

The smartphone 200 connected to the portable security device 100 through Wi-Fi Direct, that is, the smartphone carried by the user, acquires current position information and date and time information using a GPS module included therein and extracts map information corresponding to the current position from map data on the basis of the current position information upon reception of the rescue request information from the portable security device 100. Here, it is desirable to acquire, as the map information, map information corresponding to the position information through interoperation with a map application such as Google Maps or Naver Map. The position information may be information used for a rescuer to track the position of the user in real time on the basis of position tracking.

Subsequently, the extracted map information, image and voice information input in real time, an the current date and time information (year, month, date, time, minute and second) are mapped as rescue information and the pre-registered rescuer terminal information is extracted. Here, it is desirable that the user register the rescuer terminal information with applications in advance. The rescuer terminal information is terminal information used by a rescuer to which the user requests rescue. The rescuer may be an individual or an organization such as a fire station or a police station. Here, the number of rescuers to be registered is not limited.

The smartphone 200 generates the rescue information as described above and then transmits the same to the security server 400 through the network 300.

The security server 400 receives the rescue information transmitted from the smartphone 300, generates a security message on the basis of the rescue information and transmits the security information to the rescuer terminal on the basis of the transmitted rescuer terminal information.

Subsequently, when a response to the rescue request is generated from the rescue terminal, the response is transmitted to the smartphone 200 through the network 300. Upon reception of the response to the rescue request, the smartphone 200 converts the response into local wireless data and transmits the same to the portable security device 100 connected thereto through Wi-Fi Direct.

Upon reception of the response to the rescue request from the smartphone 200, the portable security device 100 notifies the user of reception of the response by generating vibration and, simultaneously, turning on the blue LED.

Accordingly, the user can recognize that the rescue request has been correctly delivered to the rescuer and thus feel at ease and take various measures to escape the attacker.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to technology which can automatically perform a rescue request by operating as a security device and, simultaneously, be used as a high-luminance lighting device.

EXPLANATION OF REFERENCE MARKS

101: main switch
102: power supply
103: function selection switch
104: trigger switch
105: laser/light switch
106: security controller
107: display
108: voice input unit
109: camera
110: image processor
111: security application execution unit
112: nozzle cover
113: nozzle cover driver
114: laser/light driver
115: alarm sound generator
116: speaker
117: communication unit
118: nozzle
119: laser/light
120: handle
121: handle button
122: nozzle cover
123: vibration generator
124: trigger
200: smartphone
300: network
400: server

The invention claimed is:

1. A portable security device having an Internet of Things (IoT) based rescue request function, comprising:
a main switch for selecting a rescue request function in case of emergency and receiving a security function and operation command;
a security application execution unit for executing a security application when a security function is selected through the main switch;
a camera for capturing an image when photographing is selected through the main switch;
a voice input unit for receiving a voice input through a microphone in case of the security function;
a security controller for generating rescue request information including the image captured by the camera, the voice acquired through the voice input unit and security information stored in an internal memory according to the security application executed by the security application execution unit, and controlling transmission of the generated rescue request information; and a communication unit for establishing local wireless communication with a smartphone, converting the rescue request information into wireless data by interoperating with the security controller and transmitting the wireless data to the smartphone.

2. The portable security device according to claim 1, wherein the communication unit receives a response signal to the rescue request information, transmitted from the smartphone, and transmits the response signal to the security controller to achieve bidirectional communications.

3. The portable security device according to claim 1, further comprising:
a vibration generator for generating vibration upon the transmission of the rescue request information or reception of the response signal under a control of the security controller;
a power supply including a rechargeable battery; and
a display for displaying a charging state of the rechargeable battery and captured pictures or images and visually indicating a rescue request or a response signal when the rescue request or the response signal is received,
wherein the power supply serves as an auxiliary battery for charging a portable device with power stored in the rechargeable battery when connected to the portable device.

4. The portable security device according to claim 1, wherein the camera photographs a surrounding environment to capture the image for remote monitoring and tracking when the security function is not used according to a function input through the main switch, and the security controller controls the image acquired by the camera to be transmitted through the communication unit when a non-security function is executed, maps the captured image to date and time information and stores the mapped information in the internal memory.

5. The portable security device according to claim 1, further comprising:
a laser/light driver to emit a laser and high-luminance light under a control of the security controller;
a function selection switch for selecting a CCTV function or an emergency alert function; and
an alarm sound generator for generating an alarm sound under the control of the security controller,
wherein the laser/light driver serves as a light when a non-security function is executed, and the alarm sound generator generates the alarm sound through a speaker when the emergency alert function is executed or a first stage of a trigger is operated.

6. The portable security device according to claim 1, further comprising a trigger switch for detecting an operating state of a trigger according to user manipulation and delivering the detected operating state to the security controller,
wherein the security controller controls opening of a nozzle cover covering a nozzle for spraying a tear gas, automatic transmission of rescue request information, generation of alarm and emission of high-luminance light upon detection of a first stage operation through the trigger switch and controls spray of a dacryogenic solution upon detection of a second stage operation through the trigger switch.

7. The portable security device according to claim 1, further comprising:

a body;
a handle provided to the body and providing convenience in use of the security device; and
a handle button for folding and unfolding the handle according to user manipulation,
wherein the handle is folded into or unfolded from the body in a sliding manner.

8. A security system using a portable security device having an IoT based rescue request function, comprising:
the potable security device performing a real-time rescue request on a basis of the IoT and executing a security function in case of emergency and normally serving as a CCTV;
a smartphone establishing a local wireless network connection with the portable security device through Wi-Fi Direct, extracting map information using current position information when rescue request information is generated from the portable security device, mapping the extracted map information, a rescue request image, current date and time information and rescuer terminal information to one another and transmitting the mapped information as rescue information to a security server; and
the security server receiving the rescue information transmitted from the smartphone, generating a security message on a basis of the rescue information and transmitting the security message to a rescuer terminal.

9. The security system according to claim 8, wherein the portable security device comprises:
a main switch for selecting a rescue request function in case of emergency situation and receiving a security function and operation command;
a security application execution unit for executing a security application when a security function is selected through the main switch;
a camera for capturing an image when photographing is selected through the main switch;
a voice input unit for receiving a voice input through a microphone in case of the security function;
a power supply including a rechargeable battery;
a security controller for generating the rescue request information including the image captured by the camera, the voice acquired through the voice input unit and security information stored in an internal memory according to the security application executed by the security application execution unit, and controlling transmission of the generated rescue request information;
a communication unit for establishing local wireless communications with a smartphone, converting the rescue request information into wireless data by interoperating with the security controller and transmitting the wireless data to the smartphone;
a laser/light driver to emit a laser and high-luminance light under a control of the security controller;
a function selection switch for selecting a CCTV function or an emergency alert function;
an alarm sound generator for generating an alarm sound under the control of the security controller;
a vibration generator for generating vibration upon the transmission of the rescue request information or reception of a response signal under the control of the security controller;
a display for displaying a charging state of the rechargeable battery and captured pictures or images and visually indicating the rescue request or the response signal when the rescue request or the response signal is received;
a body;
a handle providing convenience in use of the security device; and
a handle button for folding and unfolding the handle according to user manipulation.

\* \* \* \* \*